US009833031B2

(12) United States Patent
Erwin et al.

(10) Patent No.: US 9,833,031 B2
(45) Date of Patent: Dec. 5, 2017

(54) SAFETY ACCESSORY WITH SITUATIONAL AWARENESS AND DATA RETENTION

(71) Applicant: Accenture Global Services Limited, Dublin (IE)

(72) Inventors: Michael W. Erwin, Austin, TX (US); Bartley S. Gillan, Austin, TX (US); William W. Hurley, II, Austin, TX (US); Ben E. Lamm, Austin, TX (US); Philip A. Wheat, Austin, TX (US)

(73) Assignee: Accenture Global Services Limited, Dublin (IE)

( * ) Notice: Subject to any disclaimer, the term of this patent is extended or adjusted under 35 U.S.C. 154(b) by 171 days.

(21) Appl. No.: 14/286,661

(22) Filed: May 23, 2014

(65) Prior Publication Data

US 2014/0348484 A1    Nov. 27, 2014

Related U.S. Application Data

(60) Provisional application No. 61/826,766, filed on May 23, 2013.

(51) Int. Cl.
*A42B 3/00* (2006.01)
*A42B 3/04* (2006.01)
(Continued)

(52) U.S. Cl.
CPC .............. *A42B 3/042* (2013.01); *A42B 3/046* (2013.01); *H04N 5/772* (2013.01); *H04N 9/8205* (2013.01); *H04N 7/181* (2013.01)

(58) Field of Classification Search
USPC ......................................................... 348/115
See application file for complete search history.

(56) References Cited

U.S. PATENT DOCUMENTS

| 5,978,972 A | 11/1999 | Stewart et al. |
| 6,270,386 B1 * | 8/2001 | Visocekas ............ A41D 13/018 441/104 |

(Continued)

FOREIGN PATENT DOCUMENTS

| FR | 2875417 A1 * | 3/2006 | ......... A63B 24/0062 |
| JP | 03121947 A * | 5/1991 | |
| JP | 2008225777 A * | 9/2008 | |

OTHER PUBLICATIONS

"How Hovding Works", accessed Apr. 2, 2013, pp. 1-4.

(Continued)

*Primary Examiner* — Dave Czekaj
*Assistant Examiner* — Shanika Brumfield
(74) *Attorney, Agent, or Firm* — Fish & Richardson P.C.

(57) ABSTRACT

A video recording system for a head safety device includes a microcontroller and an accelerometer mounted in the head safety device. The accelerometer is coupled to the microcontroller. A plurality of camera modules are mounted on the head safety device and coupled to the microcontroller. The camera modules are positioned facing outward to obtain images at different angles of an environment surrounding the head safety device. The microcontroller receives data from the accelerometer and automatically initiates video recording with the camera modules when movement of the head safety device, as sensed using the accelerometer, reaches or exceeds a selected movement threshold.

20 Claims, 6 Drawing Sheets

(51) Int. Cl.
  H04N 5/77 (2006.01)
  H04N 9/82 (2006.01)
  H04N 7/18 (2006.01)

(56) References Cited

U.S. PATENT DOCUMENTS

| | | | |
|---|---|---|---|
| 7,693,668 B2 | 4/2010 | Vock et al. | |
| 8,402,568 B2 | 3/2013 | Alstin et al. | |
| 8,723,986 B1 * | 5/2014 | Merrill, Jr. | H04N 5/232 348/207.99 |
| 9,143,670 B1 * | 9/2015 | Cilia | H04N 5/23245 |
| 9,247,779 B1 * | 2/2016 | Aloumanis | A42B 3/0406 |
| 2002/0095490 A1 * | 7/2002 | Barker | H04L 29/06 709/224 |
| 2003/0045402 A1 * | 3/2003 | Pyle | A61H 1/0214 482/51 |
| 2003/0088291 A1 * | 5/2003 | Anderson | A61N 1/37235 607/32 |
| 2004/0075540 A1 * | 4/2004 | Yasui | B60R 25/1025 348/148 |
| 2005/0088522 A1 * | 4/2005 | Creviston | H04N 5/782 348/148 |
| 2005/0151671 A1 * | 7/2005 | Bortolotto | G08G 1/054 348/148 |
| 2005/0219372 A1 * | 10/2005 | Watanabe | H04M 1/021 348/207.99 |
| 2006/0009234 A1 * | 1/2006 | Freer | H04W 4/02 455/456.1 |
| 2007/0236451 A1 * | 10/2007 | Ofek | G06F 3/0304 345/157 |
| 2008/0062297 A1 * | 3/2008 | Sako | G02B 27/017 348/333.02 |
| 2009/0102763 A1 * | 4/2009 | Border | H04N 7/144 345/87 |
| 2009/0109292 A1 * | 4/2009 | Ennis | A42B 3/042 348/158 |
| 2010/0156653 A1 * | 6/2010 | Chaudhari | G01C 9/00 340/686.1 |
| 2010/0311385 A1 * | 12/2010 | Hurwitz | G08B 25/016 455/404.1 |
| 2012/0188083 A1 | 7/2012 | Miller, II | |
| 2013/0074248 A1 | 3/2013 | Evans et al. | |
| 2013/0110415 A1 * | 5/2013 | Davis | A42B 3/046 702/41 |

OTHER PUBLICATIONS

"SMART—The World's first smart cycling helmet", indiegogo.com, accessed Apr. 2, 2013, pp. 1-15.
"Video Head Camera Helments", accessed Apr. 2, 2013, 1 page.
"Who Needs a GoPro When Your Helmet's Already a Camera?", Andrew Liszewski, Feb. 7, 2013, pp. 1-4.

* cited by examiner

SAFETY ACCESSORY WITH SITUATIONAL AWARENESS AND DATA RETENTION

PRIORITY CLAIM

This application claims priority to U.S. Provisional Application Ser. No. 61/826,766 entitled "SAFETY ACCESSORY WITH SITUATIONAL AWARENESS AND DATA RETENTION" filed May 23, 2013, which is incorporated herein by reference in its entirety.

BACKGROUND

1. Field of the Invention

The present disclosure relates generally to devices worn for head safety. More particularly, the invention relates to wearable devices, such as helmets, that are operable to sense acceleration and record video segments in time with that acceleration.

2. Description of Related Art

Helmets are generally worn for safety protection during physical activities that have some type of inherent danger. For example, helmets may be worn during sports activities such as, but not limited to, bicycling, skiing, snowboarding, football, and skateboarding. While there are many video recording devices associated with helmets (e.g., GoPro). Most devices are attached or mounted to the helmet and extend from the helmet in such a manner that may not be feasible or may be awkward in ordinary situations. For example, many users are not likely to wear such video devices when during general daily bike riding (e.g., bike commuting or riding around town).

In addition, most of the current video recording devices associated with helmets require the user to stop/start the video recording manually and/or using a timer. Thus, video may not be recorded in situations where a video recording may be helpful. For example, the user may not be recording video in an unplanned bicycle accident such as a hit-and-run bicycle accident with an automobile. Having a recorded video during such an incident may be useful in determining injuries to the helmet wearer and/or discovering details of the accident (e.g., identifying other vehicles involved in the accident). Thus, there is a need for a video recording device associated with a helmet (e.g., a head safety device) that will automatically record video and/or audio in the event of an incident (e.g., a bicycle accident).

SUMMARY

In certain embodiments, a video recording system for a head safety device includes a microcontroller and an accelerometer mounted in the head safety device with the accelerometer coupled to the microcontroller. A plurality of camera modules may be mounted on the head safety device and coupled to the microcontroller. The camera modules may be positioned facing outward to obtain images at different angles of an environment surrounding the head safety device. In some embodiments, the camera modules provide a 360° view in a horizontal plane around the head safety device and a 180° view in a vertical plane around the head safety device. The microcontroller may be operable to receive data from the accelerometer and automatically initiate video recording with the camera modules when movement of the head safety device, as sensed using the accelerometer, reaches or exceeds a selected movement threshold.

In certain embodiments, a method for recording video from a head safety device includes sensing movement of the head safety device with an accelerometer mounted in the head safety device, receiving data from the accelerometer in a microcontroller mounted in the head safety device, and automatically initiating video recording using a plurality of camera modules mounted on the head safety device when the sensed movement of the head safety device reaches or exceeds a selected movement threshold in the data received by the microcontroller. The camera modules may be positioned facing outward to obtain images at different angles of an environment surrounding the head safety device. In some embodiments, video is recorded for a selected period of time.

In some embodiments, video from the camera modules is constantly recorded and stored in a buffer of a selected size. After the selected movement threshold is reached or exceeded by movement of the head safety device, the video stored in the buffer may be saved. In some embodiments, audio from an audio input on the head safety device is constantly assessed while the head safety device is in motion. Video recording may be automatically initiated when a selected change occurs in the assessed audio. In some embodiments, an emergency message is automatically provided through a mobile device when video recording is initiated.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
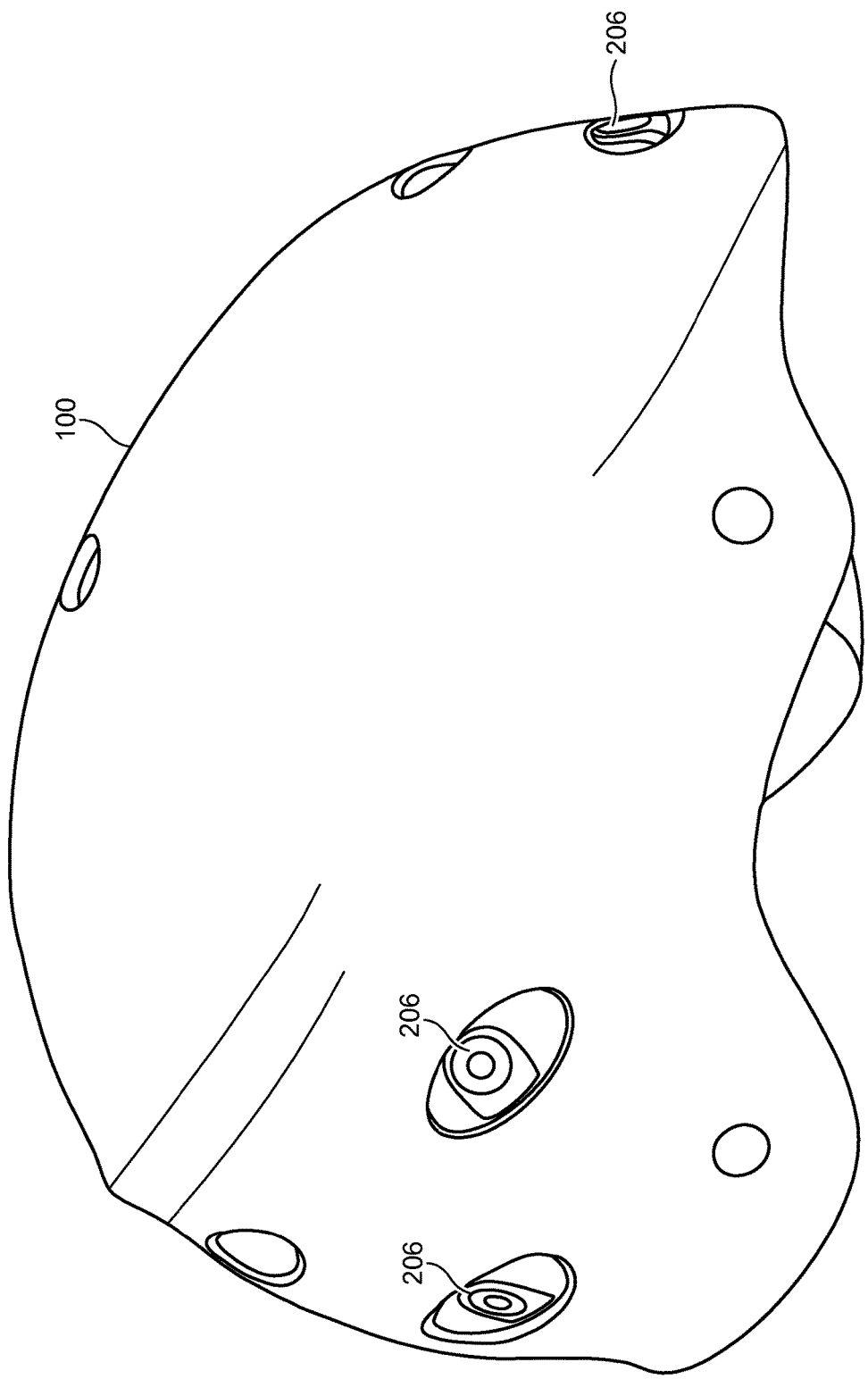
FIG. 1 depicts a profile view of an embodiment of a helmet.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner.

Figure 2:
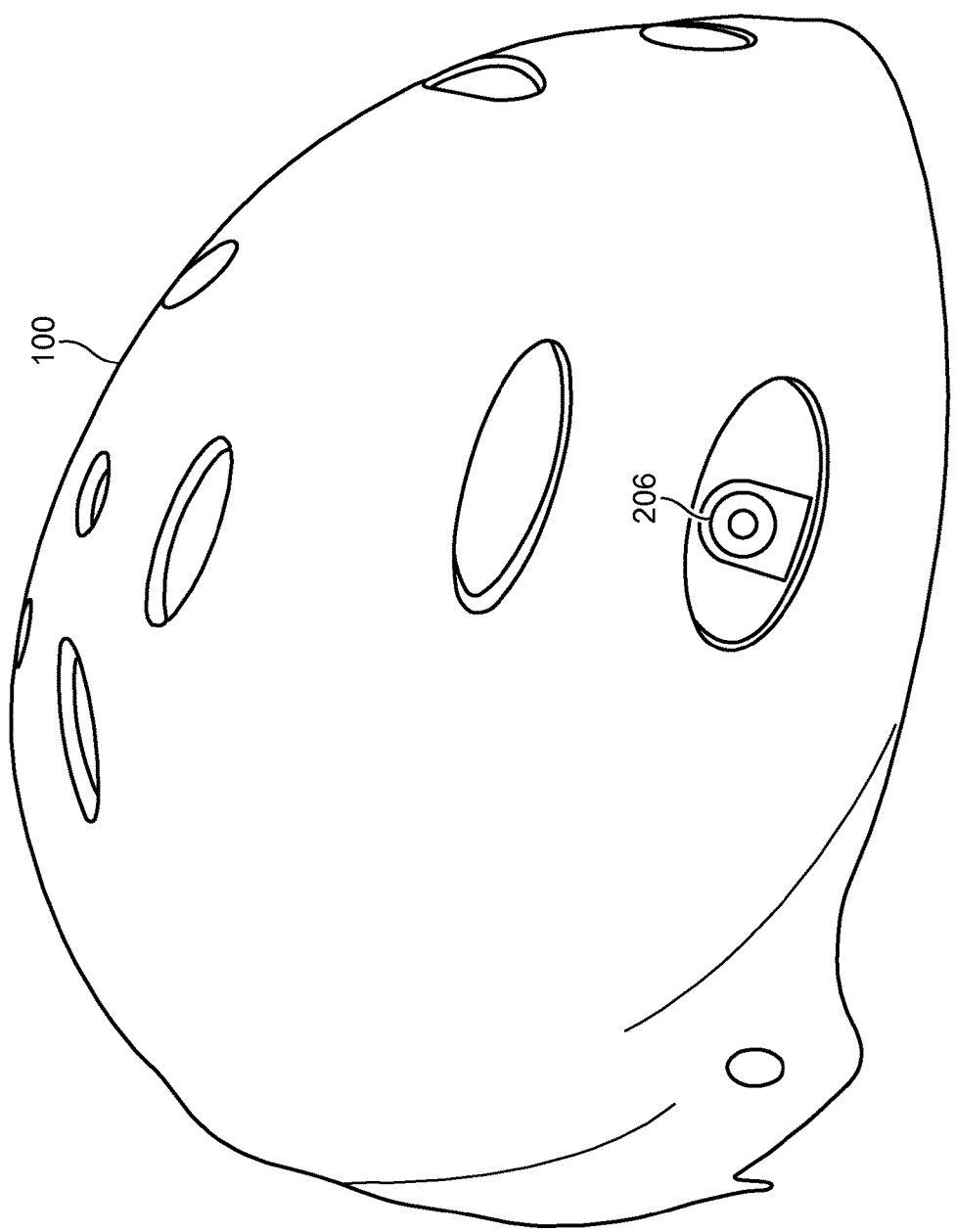
FIG. 2 depicts a perspective view of an embodiment of a helmet.
Figure 3:
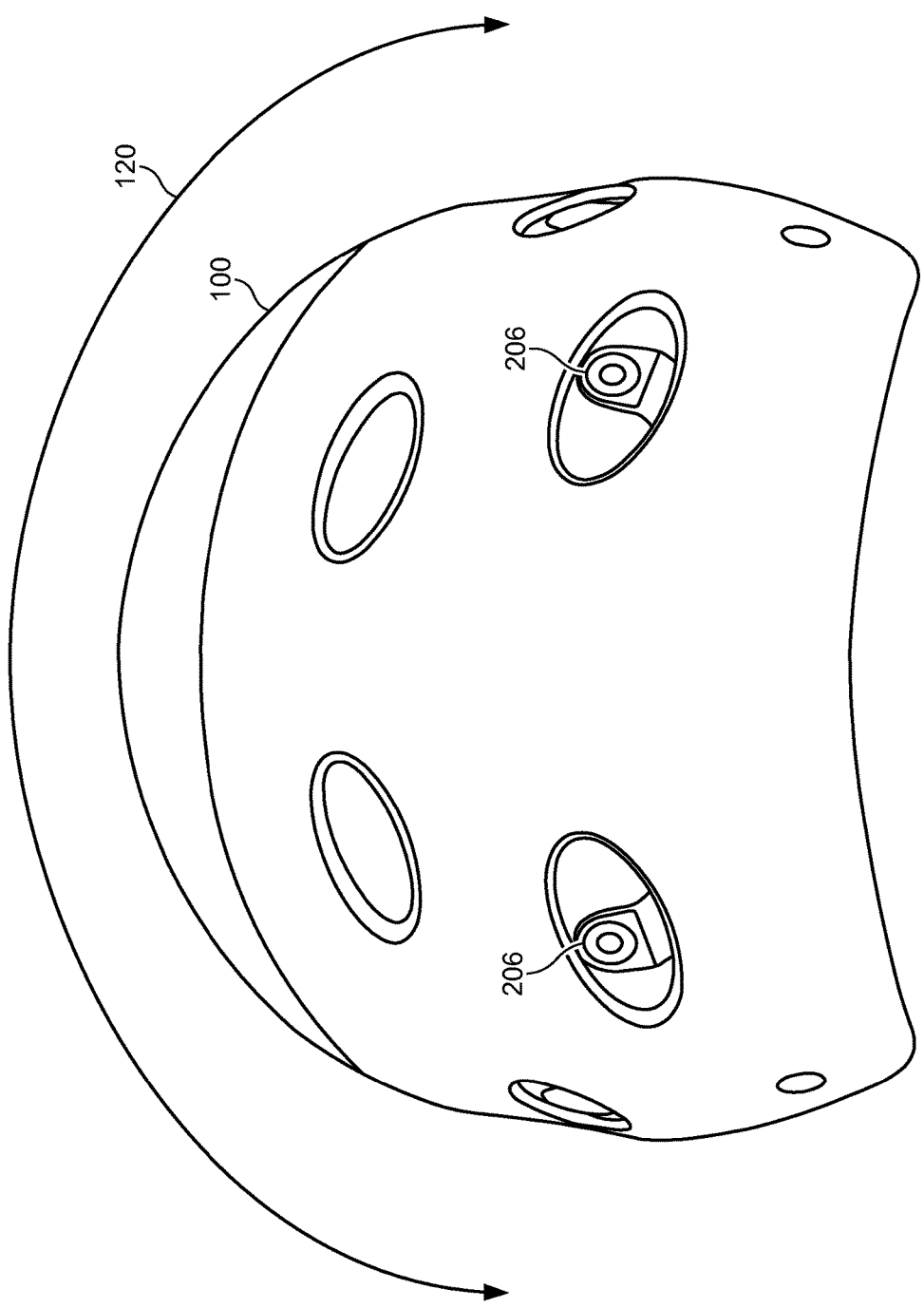
FIG. 3 depicts a back view of an embodiment of a helmet.
Figure 4:
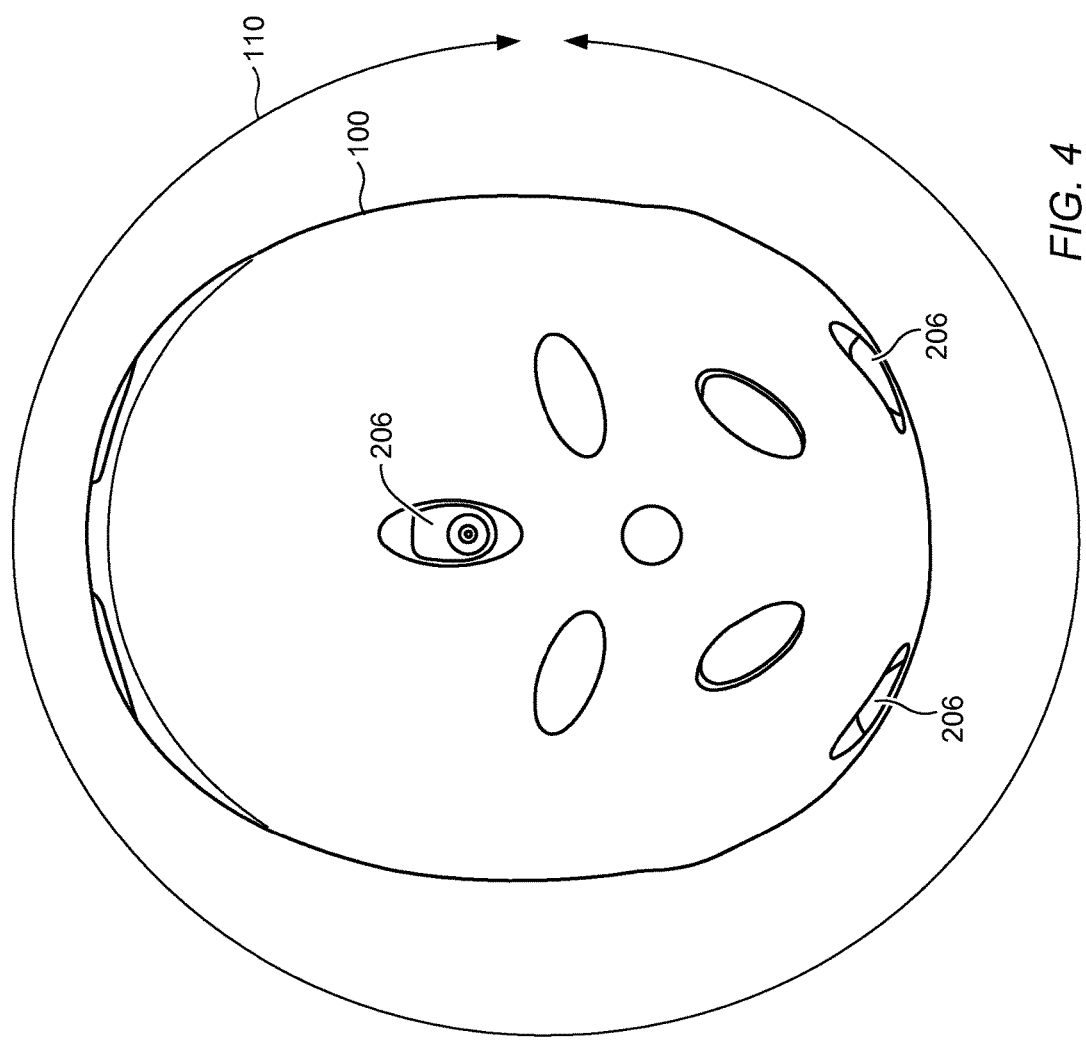
FIG. 4 depicts a top view of an embodiment of helmet.

FIG. 1 depicts a profile view of an embodiment of helmet 100. FIG. 2 depicts a perspective view of an embodiment of helmet 100. FIG. 3 depicts a back view of an embodiment of helmet 100. FIG. 4 depicts a top view of an embodiment of helmet 100. Helmet 100 may be of the style used in different recreational sports for head protection (e.g., a head safety device). In some embodiments, helmet 100 includes a helmet specifically designed for sports such as bicycling, skiing, snowboarding, football, skateboarding, and other activities where wearing the helmet is encouraged or required. In certain embodiments, the helmet contains two shells that encircle the wearer's head. The outer shell may be a hard plastic material. The inner shell may be protective foam or another shock absorbing material. The outer and inner shells may help protect the wearer's head in case of impact. The helmet may also contain one or more additionally layers used to protect the wearer's head during impact.

Figure 5:
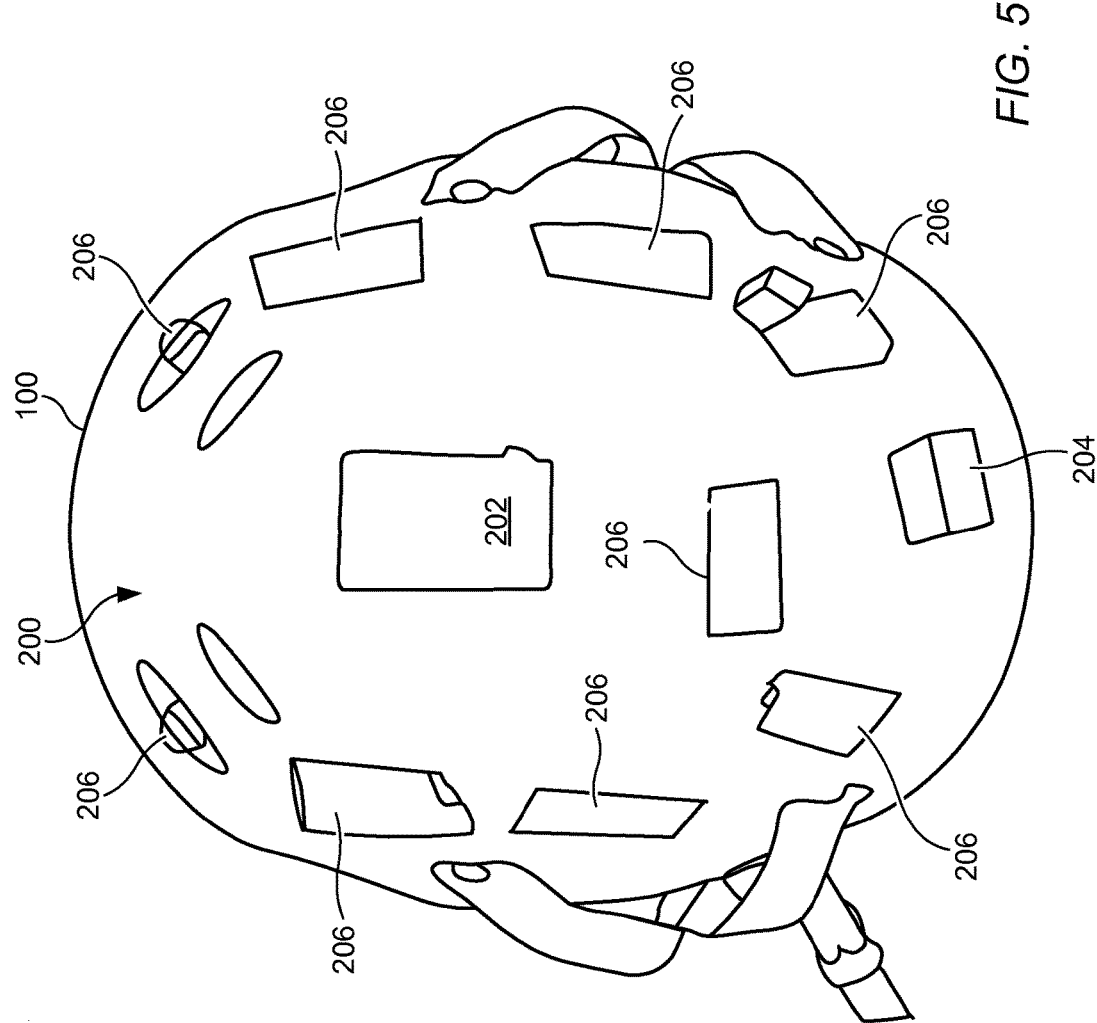
FIG. 5 depicts a bottom view of an embodiment of a helmet showing a system inside the helmet.

In certain embodiments, helmet 100 includes an electronic system including one or more electronics components positioned between the inner shell and the outer shell. The electronic system may be mounted (attached) in helmet 100 and positioned such that it is protected both from impact (by the outer shell) and the wearer's head (by the inner shell). FIG. 5 depicts a bottom view of an embodiment of helmet 100 showing system 200 inside the helmet. In certain embodiments, system 200 includes sensing and processing module 202, battery 204, and camera modules 206. Sensing and processing module 202 and battery 204 may be mounted in helmet 100 (e.g., they may be mounted or attached to the outer shell). Camera modules 206 may be coupled, mounted, or attached to the outer shell of helmet 100 to position the camera modules to view outwards from the helmet. Sensing and processing module 202, battery 204, and camera modules 206 may be coupled together using cables, wires, or other suitable connectors.

In certain embodiments, battery 204 provides power to sensing and processing module 202 and/or camera modules 206. In some embodiments, battery 204 provides power to sensing and processing module 202, which then provides power to camera modules 206. In certain embodiments, battery 204 is a rechargeable battery. Battery 204 may be charged, for example, using a USB charging port. In some embodiments, the battery may be charged using solar panels in or on helmet 100 or any other suitable charging means.

Camera modules 206 may be positioned facing outward to obtain images at different angles from the helmet wearer's head (e.g., each camera module has a different view of the surrounding environment). In certain embodiments, camera modules 206 are positioned at different angles such that the camera modules are capable of viewing a 360°×180° view around the helmet wearer's head. For example, the 360° view may be in a horizontal plane around the helmet wearer's head, represented by 110 in FIG. 4, and the 180° view may be in a vertical plane around the helmet wearer's head, represented by 120 in FIG. 3. The large field of view may be achieved by positioning each camera module 206 to capture a different view of the surrounding environment that put together provide an overall desired field of view. In some embodiments, camera modules 206 have at least some overlap between their individual views.

In certain embodiments, helmet 100 includes seven (7) camera modules 206 positioned at different locations around the helmet to provide the 360°×180° view around the helmet wearer's head, as shown in FIGS. 1-5. In some embodiments, camera modules 206 are positioned in one or more vents in helmet 100, as shown in FIGS. 1-4. It is to be understood that any number of camera modules 206 at any variety of positions may be used depending on factors such as, but not limited to, a desired field of view around the helmet wearer's head based and/or a viewing angle of each camera module.

Figure 6:
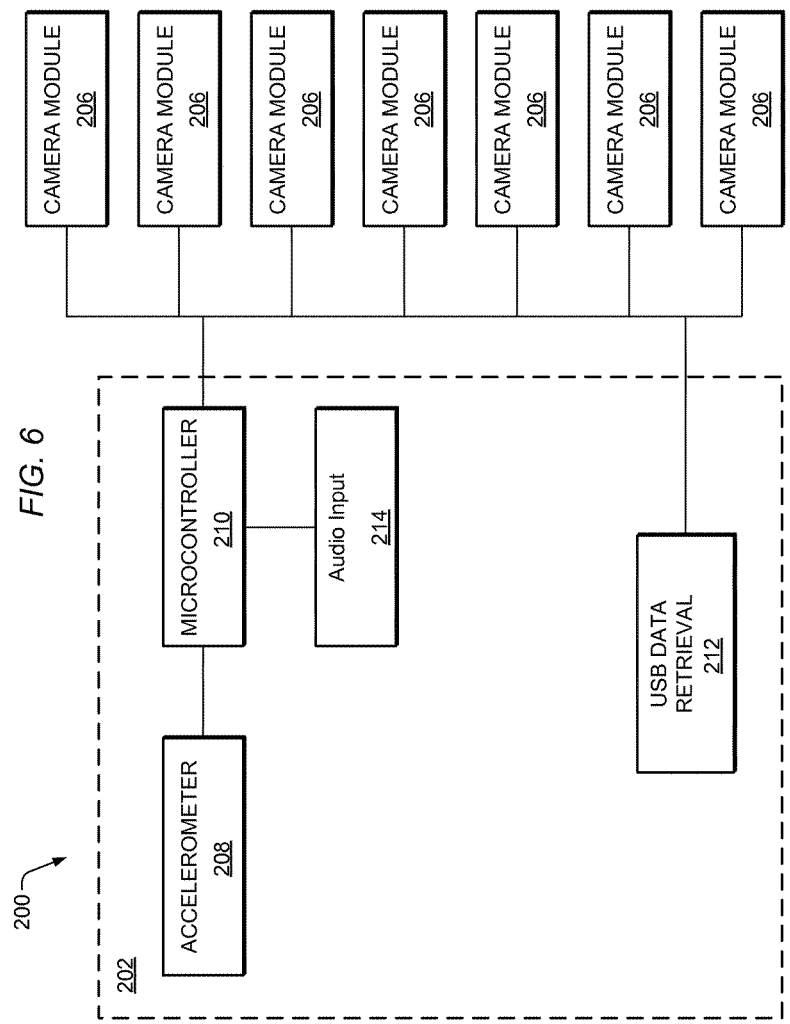
FIG. 6 depicts a block diagram of a system.

FIG. 6 depicts a block diagram of system 200. In certain embodiments, sensing and processing module 202 includes accelerometer 208 and microcontroller 210. Microcontroller 210 may include a central processing unit (CPU) and/or other units used to control and operate the accelerometer and camera modules 206. In certain embodiments, sensing and processing module 202 includes I/O means 212. For example, I/O means 212 may be a USB port or another suitable I/O interface. In some embodiments, I/O means 212 is a wireless interface (e.g., Bluetooth or Wi-Fi). I/O means 212 may allow for input of instructions to sensing and processing module 202 and/or retrieval of data from the sensing and processing module or camera modules 206. For example, a computational device (e.g., a computer, a tablet, etc.) may be coupled to I/O means 212. Software on the computational device may then be used to provide instructions to, or retrieve data from, sensing and processing module 202 and/or camera modules 206. The computational device may be coupled to and uncoupled from I/O means 212 as needed. For example, the computational device may be coupled to I/O means 212 to provide instructions to, or receive data from, sensing and processing module 202 and/or camera modules 206 while helmet 100 is not in use (e.g., not on the wearer's head) and then uncoupled before the wearer places the helmet on his head. In some embodiments, I/O means 212 is used to charge battery 204.

In certain embodiments, each camera module 206 includes recording means for receiving and storing images/video collected. The recording means may be, for example, one or more digital recording devices. In some embodiments, microcontroller 210 includes recording means for receiving and storing images/video collected from camera modules 206. In some embodiments, the recording means is another component of sensing and processing module 202 and microcontroller 210 controls and operates the recording means.

Accelerometer 208 may be any motion sensing and/or positioning device capable of reading/sensing a rapid change in acceleration speed. In certain embodiments, accelerometer 208 is a three-axis accelerometer. In some embodiments, sensing and processing module 202 includes an additional position sensing device (e.g., a GPS sensor or cellular signal triangulation device).

In certain embodiments, sensing and processing module 202 (e.g., microcontroller 210) controls when video/images are collected or recorded from camera modules 206 using the recording means. In certain embodiments, data from accelerometer 208 is used by microcontroller 210 to trigger/start video (or image) recording in a desired situation. For example, video recording may begin when movement (acceleration) of helmet 100 sensed using accelerometer 208 reaches or exceeds a selected movement threshold. The selected movement threshold may be unidirectional or may include different movement thresholds in different directions (e.g., different movement thresholds in vertical, horizontal, or rotational directions). In certain embodiments, the selected movement threshold is set at a value such that video recording begins in certain situations—such as automatically in a fall or accident or purposely by a solid tap of a hand on helmet 100. Thus, when such a certain situation arises, video recording begins automatically as long as movement (acceleration) that reaches or exceeds the selected movement threshold is sensed using accelerometer 208 in at least one direction.

In certain embodiments, the selected movement threshold is programmed into sensing and processing module 202 by software on a computational device coupled to the sensing and processing module. The selected movement threshold may be selected based on parameters input by a user into the software on the computational device (e.g., use of helmet 100, average speed of wearer, weight of wearer, etc.). In some embodiments, the selected movement threshold is adjusted using a switch or switches located on system 200. For example, the switch may select from two or more selected movement thresholds programmed into sensing and processing module 202 by the software (e.g., the switch can select between different uses of the helmet and the selected movement threshold is determined based on other parameters programmed into the sensing and processing module).

In certain embodiments, after the selected movement threshold is reached or exceeded by movement of helmet 100, video is recorded for a selected time period. For example, video may be recorded for about 30 seconds after movement of helmet 100 reaches or exceeds the selected movement threshold. The selected time period may be programmed into sensing and processing module 202 by software on the computational device coupled to the sensing and processing module. In some embodiments, the selected time period is adjusted using a switch or switches located on system 200.

In certain embodiments, video is constantly recorded and stored in a buffer of a selected size. For example, video may be constantly recorded and stored in a constantly refreshing circular buffer of storage data. The buffer may, for example, continuously store the last 30 seconds of video from camera modules 206. After the selected movement threshold is reached or exceeded by movement of helmet 100, the video stored in the buffer may be saved to provide recorded video for a selected time before the situation that caused the selected movement threshold to be reached or exceeded. Thus, system 200 may provide recorded video before and after an accident or other situation involving the wearer of the helmet 100.

In certain embodiments, system 200 includes audio input 214. Audio input 214 may be, for example, a microphone or other audio collection device located on helmet 100. In certain embodiments, audio is collected using audio input 214 at substantially the same time video is collected using camera modules 206. Sensing and processing module 202 may synchronize audio collection from audio input 214 with video collection from camera modules 206. In some embodiments, audio from audio input 214 is constantly assessed while helmet 100 is in motion. Changes in audio input (e.g., a loud noise, car horn, braking noise, etc.) may then be used to trigger (begin) video recording using camera modules 206. Using change in audio input may allow recording of video to begin before an incident (situation) causes change in movement (acceleration) of helmet 100.

In certain embodiments, system 200 communicates with a helmet wearer's personal device via I/O means 212. For example, the helmet wearer may have a mobile phone or other mobile device (e.g., GPS device or fitness tracker device) that wirelessly communicates (via Bluetooth or Wi-Fi) with system 200. Communication between the helmet wearer's personal device and system 200 may allow the system to send automatic messages (via, for example, text message or email) in the event of an incident (situation) that causes video recording to be initiated. For example, system 200 may send an emergency text message (via, for example, e911) to alert first responders to the incident. In some embodiments, the emergency text message may be sent directly by system 200 if, for example, the system includes its own communication (e.g., cellular) module.

In some embodiments, communication between the helmet wearer's personal device and system 200 allows the personal device to be used to program the system and/or monitor functions within the system. For example, the personal device may be used to stream video/audio data from system 200, download video/audio data from the system, and/or visualize (e.g., view on screen) video/audio data from the system. The personal device may also be used to program instructions into system 200 (e.g., the personal device is used as a computational device described herein).

In certain embodiments, software on the computation device coupled to system 200 provides certain functions for viewing video/audio data received from the system. In some embodiments, the software allows visualization of videos from each camera module 206 substantially simultaneously and synchronized. A user may view all the videos on a single screen to show all the viewpoints from helmet 100 simultaneously (e.g., the videos are shown as individual frames on the single screen). The software may include functions to time stamp and/or synchronize video from each camera module 206. In some embodiments, the software allows the user to zoom in on one or more of video frames. In some embodiments, the software includes video and/or audio enhancement algorithms to sharpen video and/or clarify audio.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a module" includes a combination of two or more modules and reference to "a material" includes mixtures of materials.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system comprising:
   at least one processor; and a memory communicatively coupled to the at least one processor, the memory storing instructions which, when executed by the at least one processor, cause the at least one processor to perform operations comprising:
receive a selection of a use of a wearable safety device, the selection made using at least one switch that is located on the wearable safety device and that selects between at least two different uses of the wearable safety device that are associated, in the memory, with at least two different acceleration threshold values;
determine an acceleration threshold value based on at least one user-input parameter, the acceleration threshold value being adjusted based on the selected use of the wearable safety device that is selected using the at least one switch;
receive accelerometer data from at least one accelerometer that is attached to the wearable safety device; and
based on the accelerometer data indicating that a change in movement of the wearable safety device is at least the acceleration threshold value, provide video data generated by at least one camera module that is attached to the wearable safety device, wherein the video data captures a field of view in proximity to the wearable safety device.

2. The system of claim 1, wherein providing the video data includes:
causing the at least one camera module to begin generating the video data; and
receiving the video data.

3. The system of claim 1, wherein:
the video data is stored in a buffer; and
providing the video data includes saving, from the buffer to data storage, at least a portion of the video data that is generated during a time period that includes a time when the change in movement is at least the acceleration threshold value.

4. The system of claim 1, wherein the at least one camera module is arranged to capture at least two different views from the wearable safety device.

5. The system of claim 1, wherein:
the accelerometer data describes the movement of the wearable safety device in multiple directions; and
the video data is provided based on the change in movement in at least one of the multiple directions being at least the acceleration threshold value.

6. The system of claim 1, wherein the change in movement is an acceleration of the wearable safety device.

7. The system of claim 1, wherein the microcontroller is further configured to provide the video data based on a change in audio data generated by at least one audio input device attached to the wearable safety device.

8. The system of claim 1, wherein the at least one user-input parameter includes one or more of:
an average speed of a wearer of the wearable safety device; and
a weight of the wearer of the wearable safety device.

9. A computer-implemented method performed by at least one processor, the method comprising:
receiving, by the at least one processor, a selection of a use of a wearable safety device, the selection made using at least one switch that is located on the wearable safety device and that selects between at least two different uses of the wearable safety device that are associated, in memory, with at least two different acceleration threshold values;
determining, by the at least one processor, an acceleration threshold value based on at least one user-input parameter, the acceleration threshold value being adjusted based on the selected use of the wearable safety device that is selected using the at least one switch;
receiving, by the at least one processor, accelerometer data from at least one accelerometer that is attached to the wearable safety device; and
based on the accelerometer data indicating that a change in movement of the wearable safety device is at least the acceleration threshold value, providing, by the at least one processor, video data generated by at least one camera module that is attached to the wearable safety device, wherein the video data captures a field of view in proximity to the wearable safety device.

10. The method of claim 9, wherein providing the video data includes:
causing the at least one camera module to begin generating the video data; and
receiving the video data.

11. The method of claim 9, wherein:
the video data is stored in a buffer; and
providing the video data includes saving, from the buffer to data storage, at least a portion of the video data that is generated during a time period that includes a time when the change in movement is at least the acceleration threshold value.

12. The method of claim 9, wherein the at least one camera module is arranged to capture at least two different views from the wearable safety device.

13. The method of claim 9, wherein:
the accelerometer data describes the movement of the wearable safety device in multiple directions; and
the video data is provided based on the change in movement in at least one of the multiple directions being at least the acceleration threshold value.

14. The method of claim 9, wherein the change in movement is an acceleration of the wearable safety device.

15. The method of claim 9, further comprising:
providing, by the at least one processor, the video data, based on a change in audio data generated by at least one audio input device attached to the wearable safety device.

16. The method of claim 9, further comprising:
based on the accelerometer data indicating that the change in movement of the wearable safety device is at least the acceleration threshold value, causing, by the at least one processor, an emergency message to be sent.

17. A wearable safety device comprising:
at least one accelerometer;
at least one camera module; and
a microcontroller communicatively coupled to the at least one accelerometer and the at least one camera module, the microcontroller configured to:
receive a selection of a use of a wearable safety device, the selection made using at least one switch that is located on the wearable safety device and that selects between at least two different uses of the wearable safety device that are associated, in memory, with at least two different acceleration threshold values;
determine an acceleration threshold value based on at least one user-input parameter, the acceleration threshold value being adjusted based on the selected use of the wearable safety device that is selected using the at least one switch;

receive accelerometer data from the at least one accelerometer, the accelerometer data indicating a change in movement of the wearable safety device; and based on the change in movement being at least the acceleration threshold value, provide video data generated by the at least one camera module, wherein the video data captures a field of view in proximity to the wearable safety device.

18. The wearable safety device of claim 17, further comprising:

an inner shell; and an outer shell;

wherein the at least one accelerometer and the microcontroller are between the inner shell and the outer shell.

19. The wearable safety device of claim 17, further comprising:

at least one vent;

wherein the at least one camera module is in the at least one vent.

20. The wearable safety device of claim 17, further comprising at least one audio input device communicatively coupled to the microcontroller, wherein the microcontroller is further configured to provide the video data based on a change in audio data generated by the at least one audio input device.

* * * * *